United States Patent [19]

Person et al.

[11] Patent Number: 4,527,448

[45] Date of Patent: Jul. 9, 1985

[54] HYDRAULIC CONTROL SYSTEM FOR ELECTRONIC TRANSMISSION CONTROL

[75] Inventors: Dennis W. Person, Rockwood; Stanley L. Pierce, Northville; Po-lung Liang, Livonia, all of Mich.

[73] Assignee: Ford Motor Company, Dearborn, Mich.

[21] Appl. No.: 453,270

[22] Filed: Dec. 27, 1982

[51] Int. Cl.³ ............................................. B60K 41/04
[52] U.S. Cl. ................................................ 74/869; 74/866
[58] Field of Search ............. 74/869, 868, 867, 752 C, 74/752 A

[56] References Cited

U.S. PATENT DOCUMENTS

| | | | |
|---|---|---|---|
| 3,448,640 | 6/1969 | Nelson | 74/752 A |
| 3,675,512 | 7/1972 | Hirozawa | 74/869 |
| 3,688,607 | 9/1972 | Marlow | 74/866 |
| 3,703,109 | 1/1972 | Irie | 74/752 D |
| 3,707,891 | 2/1979 | Asano et al. | 74/869 |
| 3,719,096 | 3/1973 | Sprague et al. | 74/752 D |
| 3,726,157 | 4/1973 | Marumo | 74/866 |
| 3,752,011 | 8/1973 | Casey et al. | 74/331 |
| 3,754,482 | 8/1973 | Sanders et al. | 74/752 D |
| 3,813,964 | 6/1974 | Ichimura et al. | 74/752 A |
| 3,823,621 | 7/1974 | Kubo et al. | 74/752 A |
| 3,956,947 | 5/1976 | Leising et al. | 74/752 A |
| 4,008,630 | 2/1977 | Murakami et al. | 74/869 |
| 4,023,443 | 5/1977 | Usui et al. | 74/866 |
| 4,034,627 | 7/1977 | Mizote | 74/866 |
| 4,056,991 | 1/1977 | Sakai et al. | 74/863 |
| 4,082,013 | 4/1978 | Dornfield | 74/740 |
| 4,094,211 | 6/1978 | Espenschied | 74/866 |
| 4,102,222 | 7/1978 | Miller et al. | 74/866 |
| 4,106,368 | 8/1978 | Ivey | 74/866 |
| 4,143,563 | 3/1979 | Shindo et al. | 74/869 |
| 4,290,322 | 9/1981 | Huitema | 74/752 C |
| 4,347,765 | 9/1982 | Leonard et al. | 74/688 |
| 4,349,088 | 9/1982 | Ito et al. | 74/869 |
| 4,351,206 | 9/1982 | Lemieux et al. | 74/752 A |
| 4,385,531 | 5/1983 | Kobayashi et al. | 74/752 C |
| 4,494,423 | 1/1985 | McCarthy | 74/868 |

*Primary Examiner*—Leslie A. Braun
*Assistant Examiner*—David Novais
*Attorney, Agent, or Firm*—Frank G. McKenzie; Donald J. Harrington

[57] ABSTRACT

The hydraulic control circuit for an automatic transmission includes solenoid-operated clutch pressure valves which selectively connect line pressure to the selected clutch as the winding of the solenoids are energized and de-energized by an electronic control system. A solenoid feed valve and feedback valve operate to connect line pressure to the input port of the several clutch actuator valves, provided the clutch pressures are within certain limits. If these limits are exceeded, line pressure is disconnected from the actuator valves and is applied, instead, automatically and without respect to electronic control, to the clutches that produce a predetermined gear ratio. A coast control valve operates to regulate pressure to a servo that is pressurized at a lower level for low gear ratio operation and at a higher level for reverse drive operation. The coast control valve vents the servo if either of the clutches that produce the predetermined speed ratio are pressurized. A line pressure regulator and boost valve act in combination with an on-off valve whose state is determined by a solenoid. Minimum line pressure is established at a minimum value, determined by the pressure drops across two orifices whose sizes are predetermined, when the solenoid opens line pressure to a vent port. Maximum line pressure is determined by pressure forces developed on a boost valve when the line pressure regulator solenoid closes the boost line to the vent port.

8 Claims, 3 Drawing Figures

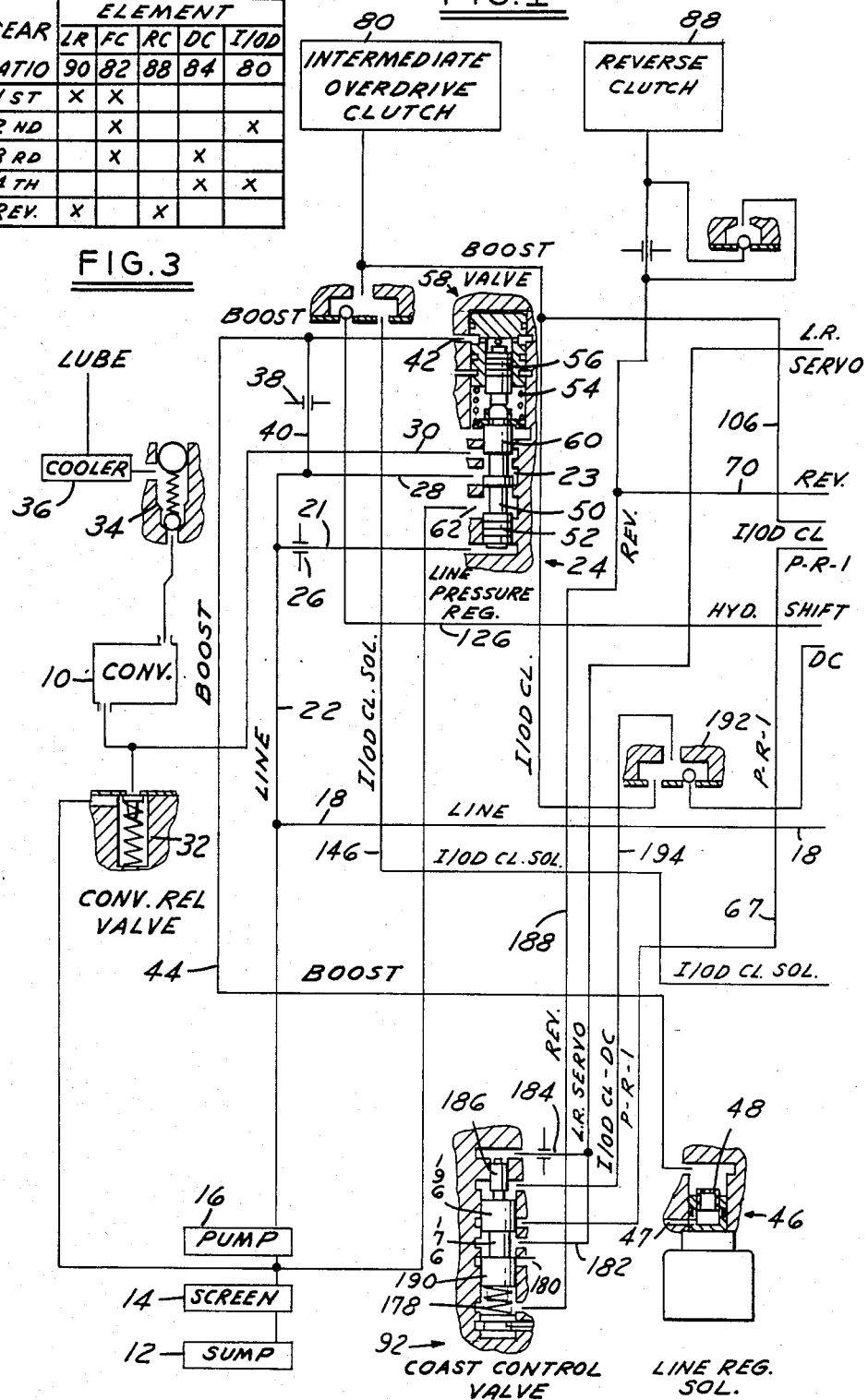

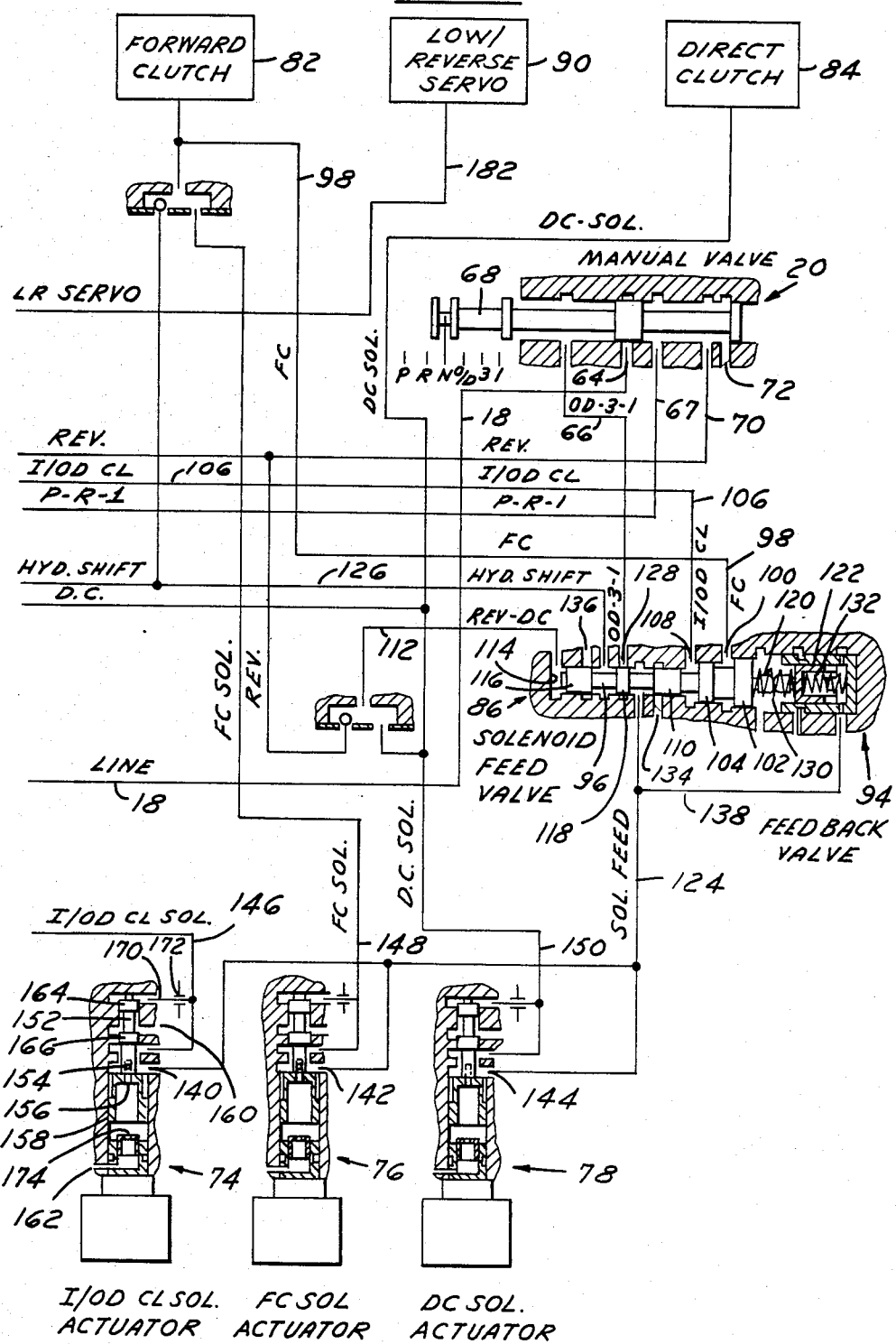

HYDRAULIC CONTROL SYSTEM FOR ELECTRONIC TRANSMISSION CONTROL

BACKGROUND OF THE INVENTION

1. Field of the Invention

This invention relates to a hydraulic control system for an automatic transmission that quickly pressurizes and quickly vents the cylinder of a clutch or servo through operation of a solenoid-operated control valve. More particularly, the invention pertains to a control system which pressurizes a brake servo at different pressure levels depending on the gear ratio in which the transmission operates.

2. Description of the Prior Art

An automatic transmission for automotive use includes planetary gearsets whose elements are hydraulically connected or held in order to produce selected ratios of the engine crankshaft speed to the speed of the output shaft of the transmission. Automatic gear change transmissions may be controlled by electronic means which produce analog current signals that operate solenoid valves. These valves connect hydraulic line pressure to selected clutches and brakes, or vent the hydraulic cylinder of these elements to atmosphere. The control system should operate such that, in the event of a control system malfunction, the transmission may operate in at least one forward speed ratio and in reverse drive in order to allow the vehicle to be driven to a service station for repair.

Fluid capacity modulator valves and accumulators operate to smooth gear ratio upshifts and downshifts by controlling the rate at which the associated clutch or servos are applied. When an upshift begins, the capacity modulator valve produces a reduced or regulated pressure which is applied to the operative clutch and to the spring of an accumulator. The accumulator is filled and pressure regulation continues until it is fully pressurized. Thereafter, regulation ceases and line pressure is directly applied to the clutch cylinder to complete the engagement. Such hydraulic systems provide gradual or rapid pressure build-up depending upon the conditions and the requirements indicated by movement of a control valve.

SUMMARY OF THE INVENTION

Forward clutch pressure, intermediate/overdrive clutch pressure and direct clutch pressure are controlled electronicaly during shifting. Clutch pressure is regulated as required by an actuator valve when a pulse width modulated signal is applied to the winding of the clutch solenoid.

A coast control valve works with the manual valve to regulate low/pressure servo pressure when the manual valve is moved to the 1 position at which engine braking is provided. When the manual valve is moved to the reverse position, the coast control valve directs hydraulic fluid at line pressure to the low/reverse servo. The coast control valve vents the low reverse servo if either of the clutches required to produce the second, third or fourth speed ratios is pressurized. This eliminates the need for a solenoid to control the low/reverse servo. The low/reverse servo has pressure applied to it that is regulated to a fairly low magnitude when the manual valve is in the Park and 1 positions, is equal to line pressure when the manual valve is moved to the Reverse position and is vented when the transmission is operating in the fourth, third or second speed ratio. This venting of the low/reverse servo prevents a tie-up if the manual valve is moved to the 1 position when the transmission is operating in the second, third or fourth forward speed ratio.

This invention provides a consistent and high quality shift, a precise shift scheduling for improved fuel economy, reduced hydraulic control complexity, reduced size, weight and cost and a substantial reduction in the number of mechanical components in the transmission.

BRIEF DESCRIPTION OF THE DRAWING

FIGS. 1 and 2 show a schematic diagram of the hydraulic control system according to this invention.

FIG. 3 shows a schedule for the forward drive ratios and reverse drive ratio of the transmission and the various clutches and servos that are pressurized to produce each of these drive ratios.

DESCRIPTION OF THE PREFERRED EMBODIMENT

Refering to FIG. 1, the transmission is supplied with enough fluid to keep a torque converter 10 completely filled, operate the hydraulic controls, lubricate the working parts and provide a reserve of fluid in the sump 12, which is a storage space in the oil pan at the bottom of the transmission case. Atmospheric pressure in the sump forces fluid through the sump screen 14 and into the evacuated inlet of the pump 16. Fluid delivered by the pump is displaced at a volumetric rate which is in proportion to the speed at which the pump is driven. The pump is sized to deliver more fluid than the transmission needs and excess hydraulic fluid is recirculated to the sump by the pressure regulator system and other portions of the hydraulic control system.

The output of the pump connected by hydraulic line 18 supplies fluid regulated to line pressure to the manual valve 20. The pump outlet is connected through lines 22 and 28 to the control chamber 23 of a main regulator valve 24. The orifice 26 in line 21 has an appreciable pressure drop across it only when flow in line 21 reverses direction at high frequency.

The pump outlet supplies hydraulic fluid through line 28 to a central chamber of valve 24. The torque converter circuit is charged or pressurized through line 30, which leads from regulator valve 24. The converter circuit includes a relief valve 32, which is adapted to open the circuit to the pump inlet as necessary to protect the converter from excessive pressure build-up. Upon leaving the converter, hydraulic fluid passes through a check valve 34 which has a light spring that opens with low pressure to maintain a continuous fluid flow to the cooler 36. When the engine is shut down, the spring will reseat the valve, which prevents the converter oil from draining through the cooler and lubrication system back to sump. Therefore, the converter is maintained full of fluid and can begin to transmit torque through the turbine shaft as soon as the engine is started.

The pump outlet is also connected through orifice 38 in hydraulic line 40 to inlet port 42 of the boost valve 58 and through hydraulic line 44 to the inlet port of a line pressure regulator solenoid valve 46. The solenoid of valve 46 has a winding to which is applied a pulse width modulated signal produced by an electronic control system. Valve 46, which is normally closed, opens line 44 to a vent port through an orifice 48 when the solenoid winding is energized. Regulator valve 24 has a central chamber within which valve spool 50 moves due to the effect of a pressure force developed on land 52, the force of a spring 54 and pressure force developed on the land 56 of boost valve 58. The end of the valve chamber is blocked by a plug against which spring 54 bears. The pressure regulator and boost valve operates to control the pressure in line 18 between 60 p.s.i. and 260 p.s.i.

In order to fill the lines of the hydraulic system, the spool 50 of regulator valve 24 is moved by spring 54 to the lower end of the valve chamber, the pump is driven by the engine and the lines are filled at low pressure. As pressure begins to rise, spool 50 is forced upward against spring 54 to approximately the position shown in FIG. 1 permitting land 60 to open communication between lines 28 and 30 through which the torque converter circuit and hydraulic control system are fully charged.

Regulation of line pressure begins by opening and closing orifice 48 of line pressure regulator solenoid valve 46 as the windings of that solenoid are energized and de-energized in accordance with a pulse width modulated signal applied to the solenoid. Normally valve 46 is closed and its solenoid coil de-energized. Through operation of valve 46 line pressure is controlled by the pressure acting on land 56 of the boost valve 58. Maximum line pressure occurs when no pulse width modulated signal is applied to the line pressure solenoid winding. Then no hydraulic fluid flows through the orifices 38, 48 but pressure acts on the boost valve land 56, which applies a force through contact with valve spool 50 and the effect of spring 54 tending to close communication between lines 18, 22, 28 and vent port 62. Maximum line pressure results when the solenoid of valve 46 is de-energized and when the pressure force on land 56, plus the spring force are balanced against the pressure force on land 52 such that line 18 is closed to vent port 62. Minimum line pressure, which is determined with solenoid valve 46 energized, is equal to the sum of the pressure drops across orifices 38 and 48. When the duty cycle of the signal applied to the solenoid of valve 46 is less than 100 percent and more than 0 percent, i.e., when the solenoid winding is energized for a period whose duration is proportional to the difference between the actual line pressure and the commanded line pressure, orifice 48 opens and closes cyclically. In this way line pressure is regulated between the maximum and minimum value.

Referring now to FIG. 2, the manual valve 20 directs line pressure to the valves, clutches and servos whose actuation produces the forward and reverse drive ratios. Valve 20, whose position is controlled by the vehicle operator, receives line pressure through inlet port 64 and directs line pressure to line 66 if valve element 68 is moved to the Overdrive, 3 or 1 positions. If the valve is moved to the Park, Reverse or 1 positions, hydraulic line 67 receives line pressure. Hydraulic line 70 is pressurized with line pressure when the manual valve is moved to the Reverse position, but line 70 is open to vent port 72 when the manual valve is set other than in the Reverse position. When the manual valve is in the Overdrive, 3 or 1 positions, an electronic control system selectively energizes the windings of solenoid-operated valves 74, 76 and 78 by means of which an intermediate overdrive clutch 80, forward clutch 82 and direct clutch 84, respectively, are engaged and disengaged.

FIG. 3 shows the schedule of clutch and servo actuation required to produce the various speed ratios. While manual valve 20 is at the O/D position, any of the four forward speed ratios are produced by actuation of valves 74, 76, 78 and through operation of control valve 92. When the manual valve is at the 3 position, only the three lowest forward speed ratios can be produced. When the manual valve is at the 1 position, only the lowest forward speed ratio operation can result.

In the event of an electronic system malfunction, the transmission is shifted hydraulically to second gear through operation of a solenoid feed valve 86. When manual valve 20 is set at the Reverse position, solenoid feed valve 86 and the reverse clutch 88 are pressurized directly from the manual valve 20 with line pressure, and the low/reverse servo 90 is pressurized through operation of coast control valve 92.

Solenoid feed valve 86 has a spool element 96 on which several lands are formed. When forward clutch 82 is pressurized, hydraulic line 98 carries fluid at line pressure to a port 100 through which one face of lands 102 and 104 are pressurized. The cross sectional area of land 102 is one unit of area larger than the cross section area of land 104; therefore, the net differential area of the lands pressurized when the forward clutch is applied is one area unit. When the intermediate/overdrive clutch 80 is pressurized, hydraulic line 106 carries fluid at line pressure to port 108 through which a second differential pressure area comprising the opposite face of land 104 and one face of land 110 are pressurized. The cross sectional area of land 104 is one unit of an area larger than the cross sectional area of land 110. When either the direct clutch 84 is pressurized, or the manual valve is moved to the Reverse position, hydraulic line 112 carries fluid at line pressure to chamber 114 of the solenoid feed valve by means of which land 116 is pressurized. The cross sectional area of land 116 is substantially the same as that of lands 110 and 118, specifically one unit of area. Spool 96 has a headed end 120 which can be brought into contact with a headed end on the valve element 122 of the feedback valve 94. A spring 130 is preloaded in compression between the surfaces of land 102 and element 122. A second compression spring 132 biases element 122 leftward.

Hydraulic line 66 connects an outlet port of manual valve 20 to an inlet port of feed valve 86. Depending upon the position of spool 96, either a first solenoid valve feed line 124 or a second feed line 126 is brought into communication with inlet port 128. Solenoid feed valve 86 in cooperation with feedback valve 94 directs line pressure from port 128 to actuator valves 74, 76 and 78 if spool 96 is at the left-hand end of the valve chamber. Alternatively, if spool 96 is moved to the right-hand end of the valve chamber, valves 86 and 94 connect inlet 128 to the second feedline 126, which movement opens the first feed line 124 to vent port 134. Similarly, if line 124 is pressurized, line 126 is open to vent port 136. The first feed line 124 supplies line pressure to feedback line 138 through which the end face of element 122 is pressurized. The cross sectional area of element 122 is two unit areas.

Valves 86 and 94 operating together sense if the magnitude of solenoid feed pressure exceeds certain limits during shifting and sense if the pressure to either the direct clutch, the forward clutch or the intermediate/overdrive clutch exceeds a certain limit when the other two clutches are at line pressure. When spool 96 is at the left end of the valve chamber, direct clutch actuator valve 78, forward clutch actuator valve 76 and intermediate/overdrive clutch actuator valve 78 have solenoid feed pressure applied to inlet ports 144, 142, 140. The output from these valves carried in lines 146, 148, 150 is regulated between zero p.s.i. and line pressure, which regulation eliminates the need for accumulators to control clutch pressure during shifting. A pulse width modulated signal is selectively applied to the windings of solenoid valve 74, 76, 78, in accordance with the schedule of FIG. 3, in order to produce the second, third and fourth forward speed ratios. The solenoid of valve 76 is energized in order to engage forward clutch 82, which acts in combination with the engagement of low/reverse servo 90 to produce the first forward speed ratio.

Each of the actuating valves 74, 76, 78 includes a valve spool 152 having an orifice 154 connecting the valve chamber through an axially directed bore 156 leading to the end of valve land 158 which is formed integrally with the spool. The valve body includes a first vent port 160 and a second vent port 162 to which the valve chamber is communicated when the solenoid winding is energized. Two valve lands of equal size 164, 166 are formed integrally on the spool 152.

In operation, the intermediate/overdrive clutch 80 is filled through valve 74 when its spool 152 is in the position shown in FIG. 2 and solenoid feed line 124 is pressurized. A feedback line 170 develops a pressure force on land 164 through orifice 172, which functions to prevent cyclic movement of spool 152. The maximum pressure that can be applied to any of the clutches or servos is the line pressure. However, clutch and servo pressure can be regulated down to zero p.s.i. through operation of the actuating valve. In order to regulate clutch pressure, a pulse width modulated signal is applied to the winding of the solenoid which causes orifice 174 to open and close cyclically for variable and usually unequal periods, thereby communicating vent port 162 to the valve chamber. When orifice 174 is open, differential pressure across orifice 154 causes an unbalanced pressure force to be developed on spool 152, moving the spool downward and opening line 146 to vent port 160. During the period when the solenoid winding is de-energized, spool 152 moves upward within the chamber to the position shown in FIG. 2, and clutch pressure rises toward line pressure. It can be seen from this that the duration of the period during which the solenoid winding is energized controls the magnitude of the associated clutch pressure and in this way the clutch is vented through vent port 160 when the solenoid winding is energized for an extended period.

Referring to FIG. 3, it can be seen that the second, third and fourth speed ratios are produced when only two of the clutches in the group consisting of the forward clutch 82, direct clutch 84 and intermediate overdrive clutch 80 are pressurized concurrently. The solenoid feed valve 86 in cooperation with the feedback valve 94 operate to disconnect line pressure from solenoid feedline 124 and to connect line pressure to the second feedline 126, which directly pressurizes the forward clutch 82 and intermediate/overdrive clutch 80, thereby discounting the operation of the solenoid feed valves 74, 76, 78, when the clutch pressure in one of the lines 146, 148, 150 exceeds the predetermined limit value and the other two clutch pressure lines are within the regulated range. If the second feed line is pressurized, the transmission shifts to the second forward speed ratio where it remains until manual valve 20 is moved to the neutral position. Clutch pressure in lines 146, 148, 150 is fed back in lines 98, 106, 112 to valve 86 where each is applied to the differential areas of spool 96. The cross sectional area of element 122 of valve 94 is equal to two times each of these differential areas; therefore, the pressure in feedback line 138 opposes the force on two of the differential areas of spool 96. The third clutch pressure, therefore, acts only against the force of spring 132, which can be used to set the pressure limit on the third clutch. If this limit is exceeded, spool 96 and element 122 move to the right-hand end of their respective valve chambers and solenoid feed pressure line 124 is vented. After this occurs, spool 96 and element 122 are maintained at the right-hand end of the valve chambers, thereby snapping valve 86 to its hydraulic shift position where feed line 126 is connected to line pressure.

This position is maintained until the manual valve is moved to the Neutral position. The preloaded compression spring 130 located between spool 96 and element 122 forces spool 96 back to the left-hand end of its chamber, but when the manual valve is moved to the Reverse position, reverse pressure in chamber 114 tends to move spool 96 against this spring. The force of spring 130 assures that the spool 96 is in position to allow solenoid feedline 124 to be connected to line pressure when the manual valve is moved from the Reverse position to the Overdrive position.

The coast control valve 92 operates to regulate low/reverse servo pressure when the manual valve is in the Park and 1 positions, to connect line pressure to the low/reverse servo 90 when the manual valve is moved to the Reverse position and to prevent pressurization of the low/reverse servo when direct clutch pressure or intermediate/overdrive clutch pressure exceeds a certain limit.

When the manual valve is in the 1 position, the low/reverse servo is pressurized in order to apply the low/reverse brake band by means of which engine braking of the vehicle wheels results. However, a lower magnitude of low/reverse servo pressure is required in low gear than in reverse drive in order to prevent the brake band from slipping. For this reason the coast control valve 92 regulates low/reverse servo pressure to 25 p.s.i. when the manual valve is set at the 1 position. When the manual valve is in the Reverse position, valve 92 permits line pressure, which may vary between 60 p.s.i. and 260 p.s.i., to be applied to the low/reverse servo.

Coast control valve 92 includes a spool 176, biased by a compression spring 178 to the upper end of the valve chamber in which a vent port 180 is formed.

When manual valve 20 is moved to the 1 position, hydraulic line 67 carries fluid at line pressure to valve 92 whose spindle 176 is biased by spring 178 to the top of the valve chamber. In this position, valve 92 pressurizes hydraulic line 182, through which the low/reverse servo 90 and feedback line 184 are pressurized. The pressure developed on land 186 operates against the force of spring 178 and regulateas the magnitude of pressure in the low/reverse servo.

If the manual valve is moved to the Reverse position, line pressure carried in hydraulic lines 70 and 188 develops a force on the end of land 190 that adds to the force of spring 178 and acts to maintain valve spool 176 at the top end of the valve chamber. Therefore, line pressure carried to valve 92 in line 67 is applied directly to the low/reverse servo 90 through line 182.

In order to operate in the first forward speed ratio, only the forward clutch 82 and the low/reverse servo 90 can be pressurized. Therefore, when the manual valve is moved directly from the Overdrive position to the 1 position, coast control valve 92 operates to prevent the low/reverse servo from being pressurized while the transmission operates in the third or second gear ratios. Check valve 192 directs fluid at clutch pressure through line 194 to the coast control valve 92 when either the direct clutch or the intermediate/overdrive clutch is pressurized. This develops a pressure force on land 196 which adds to the force on the feedback land 186 in opposition to the spring force 178. Spool 176 is forced to the bottom of the valve chamber, which action opens the low/reverse servo line 182 to vent port 180. The magnitude of the intermediate/overdrive clutch pressure and direct clutch pressure are controlled by the electronic control system. When either of these clutch pressures decreases during a 2-1 coastdown shift, spring 178 moves spool 176 upward and the low/reverse servo pressure is again regulated to approximately 25 p.s.i.

Having described a preferred embodiment of our invention, what we claim and desire to secure by U.S. Letters Patent is:

1. A system for controlling operation of an automatic transmission comprising:
    multiple clutches and a brake servo which upon being pressurized connect or hold elements of the transmission gearing and upon being vented disconnect or release elements of the transmission gearing, whereby the various drive ratios are produced;
    a source of pressurized hydraulic fluid;
    a manual valve having multiple settings corresponding to selected drive range of the transmission adapted to connect the pressure source to a first outlet when the manual valve is set for operation in a first or a second drive ratio, to a second outlet when the manual valve is set for operation in the second drive ratio and to a third outlet when the manual valve is set for operation in a forward drive range;
    feedline valve means having a spool movable between first and second states on which are formed muliple differential pressure areas of substantially equal net size for hydraulically connecting the third outlet of the manual valve to a first outlet feedline when the spool is in the first state and to a second outlet feedline when the spool is in the second state;
    means communicating each clutch with a respective differential pressure area of the feedline valve spool on which are developed pressure forces that bias the spool to its second state;
    feedback valve means communicating with the first feedline having a pressure area whose size is at least one net differential pressure area less than the total net differential pressure areas of the valve spool, on which area is developed a pressure force that biases the feedline valve spool to its first state and a spring for biasing the feedline valve spool to the first state;
    actuating means for pressurizing the clutches from the first feedline and for venting the clutches;
    means for selectively communicating the second feedline to those clutches that are pressurized when a predetermined speed ratio is produced; and
    coast control valve means connected to the first and second outlets of the manual valve for connecting the brake servo to the first outlet of the manual valve, for regulating the hydraulic pressure of the brake servo when the manual valve is set for operation in the first drive ratio, and for connecting the brake servo to the first outlet of the manual valve means when the manual valve means is set for operation in the second drive ratio.

2. The system of claim 1 further comprising means connecting the second manual valve outlet with a differential pressure area of the feedline valve spool.

3. The system of claim 1 wherein the actuating means includes:
    a valve spool movable within a chamber through which the first feedline communicates with a clutch that is pressurized for forward drive operation, having a first orifice connecting portions of the chamber that are separated by a land of the valve spool on which opposed pressure forces are developed;
    a first vent port; and
    means for opening and closing flow through the orifice from the first feedline whereby the spool is urged by the opposed pressure forces toward a position where the first feedline communicates with the clutches when the orifice is open, and whereby the spool permits communication between the clutches and the first vent port when the orifice is closed.

4. The system of claim 2, wherein the opening and closing means includes:
    a second vent port;
    a second orifice located between the second vent port and the first orifice; and
    an electrical solenoid for opening and closing the second orifice in accordance with the application of electrical power to its winding.

5. The system of claim 3 wherein the actuating means includes a feedback line connecting a clutch to a second land of the valve spool on which a pressure force is developed tending to open the clutch to the vent port.

6. The system of claim 1 wherein the coast control valve means includes:
    a valve spool movable within a valve chamber biased by a spring to a first position having differential pressure areas formed thereon;
    a first inlet port through which the first outlet of the manual valve communicates with the valve chamber;
    a second inlet port through which the second outlet of the manual valve is connected to a pressure area of the spool on which is developed a pressure force biasing the spool to the first position;
    an outlet connecting the first inlet port with the brake servo means; and
    a feedback line connecting a differential pressure area of the valve spool to the brake servo, on which area is developed a pressure force urging the spool in opposition to the forces biasing the spool to the first position, whereby the connection between the outlet and brake servo is opened and closed in accordance with the position of the spool.

7. The system of claim 6 wherein the coast control valve means further includes a vent port to which the brake servo is connected and disconnected in accordance with movement of the valve spool.

8. The system of claim 7 wherein the manual valve connects the fluid pressure source to a third outlet when the manual valve is set for operation in a drive ratio produced by pressurizing clutches which are unpressurized in first and second drive ratio operation, and wherein the coast control valve means further includes a third inlet through which the third outlet of the manual valve is connected to a differential pressure area of the spool on which a net pressure force is developed urging the spool against the spring force, whereby the brake servo is connected to the vent port when the third outlet of the manual valve means is connected to the fluid pressure source.

* * * * *